3,009,908
Patented Nov. 21, 1961

3,009,908
THIOPHENOL-MODIFIED ZIEGLER CATALYST, PREPARATION THEREOF AND POLYMERIZATION OF ETHYLENE THEREBY
Harry M. Andersen, Dayton, Ohio, assignor to Monsanto Chemical Company, St. Louis, Mo., a corporation of Delaware
No Drawing. Filed Sept. 14, 1956, Ser. No. 609,798
21 Claims. (Cl. 260—94.9)

This invention relates to Ziegler catalysts, to the preparation of Ziegler catalysts, and to the use of Ziegler catalysts to effect chemical reactions, especially polymerizations. In certain preferred aspects the invention pertains to the production of high density polyethylene by polymerizing ethylene in the presence of a catalyst exemplified by the material obtained by the interaction of a trialkylaluminum with titanium tetrachloride, said catalyst having been especially treated to result in the production of polyethylene of increased density over that obtainable with the same catalyst not so treated.

SUMMARY OF INVENTION

The essence of the present invention lies in the use of a thiophenol to modify the characteristics of Ziegler catalysts, whereby the use of such modified catalysts permits the production of improved Ziegler polymers. Of especial interest is the production of polyethylene of increased density made possible by the practice of the invention.

SIGNIFICANCE OF POLYMER DENSITY

In any polymer showing the presence of a crystalline phase by X-ray diffraction, the density is normally a direct function of the crystallinity, the greater the crystallinity the higher the density. High molecular weight polymers of ethylene, called polyethylene, are important materials of commerce; they are partially crystalline semi-rigid polymers having great utility. By the use of certain types of catalysts, many of which have been advanced by Prof. Dr. Karl Ziegler, polyethylene can be made at low pressures and such polyethylene has considerably higher density (generally about 0.940 to 0.948 gram per cc.) than polyethylenes made by the high pressure oxygen- or peroxide-catalyzed polymerization methods. The density of the usual Ziegler polyethylene depends somewhat on reaction conditions and especially on liquid reaction medium, e.g., in kerosene the usual density is within the range of 0.942 to 0.947 while with heptane the usual density is about 0.948. These high density polyethylenes, as a result of their greater crystallinity, are much more rigid than the high pressure polyethylenes, and have considerably higher softening and melting points. These properties make possible improvements in the heretofore known uses of polyethylene, and indicate the likelihood that the high density polyethylenes may replace certain other thermoplastic polymers in various uses. It thus becomes clear that still further increase in crystallinity of polyethylene, which is reflected in increased density, would result in still further improvements in certain properties such as stiffness and resistance to heat. Also, increased crystallinity in polyethylene is reflected in an increased tensile yield strength which of course is quite desirable.

Various other polymers, especially those of unsaturated hydrocarbons such as propylene, butenes, styrene, and the like, can be prepared in crystalline form. It has been said that crystallinity of such polymers can result from an "isotactic" structure of the molecule, which word is used to indicate a regular arrangement of side groups along the carbon chain for at least considerable portions of the molecule. Many of the crystalline polymers of these unsaturated hydrocarbon monomers are obtained by fractionation of total polymer, obtained by polymerizing the monomers with Ziegler catalysts, such as by use of one or more solvents which dissolve the amorphous or lesser crystalline portion of the polymer; thus the heptane-insoluble polypropylene and polystyrene are more crystalline than those fractions soluble in heptane. In these polymers other than polyethylene, though crystallinity may primarily result from a regular arrangement of side groups on the chain, it also no doubt is somewhat dependent on the extent of branching of the chains, just as in polyethylene. Thus, increased linearity of polymer chain, whether it be polyethylene, polypropylene, polystyrene or the like, as reflected by a lessening of the branching of the chain, results in a higher degree of crystallinity with resulting improved properties as mentioned heretofore.

While the present invention is of especial interest at the present time with respect to polyethylene in which crystallinity is almost solely a reflection of the degree and type of branching, it is also applicable to all Ziegler polymers, special reference being made to polypropylene, polybutene and polystyrene which are currently of the most potential interest from a commercial viewpoint.

While it is presently believed that the invention is effective by modifying the extent and/or type of branching of Ziegler polymers, it is not desired to be limited by this or any other theory for the invention is operable regardless of the particular mechanism by which the results are obtained.

ZIEGLER-TYPE CATALYSTS

There has recently come into commercial prominence the polymerization of ethylene and other monomers through the agency of a type of catalyst advanced by Prof. Dr. Karl Ziegler of the Max Planck Institute at Mulheim, Ruhr, Germany. In general, Ziegler catalysts can be obtained by treating a salt or oxide of a metal of groups IV–B, V–B, VI–B, VII or VIII, with a metal of group I, II or III in metallic, hydride, or organometallic form. Naturally the production of an active catalyst will be considerably dependent on the choice of these components, their proportions, and the manner in which they may be combined. Probably the preferred group of these catalysts is that disclosed in Belgian Patent No. 533,362, issued May 16, 1955, to Ziegler, the disclosure of which is hereby incorporated herein by reference, namely catalysts prepared by the interaction of a trialkylaluminum with a compound of a metal of groups IV–B, V–B or VI–B of the periodic system, including thorium and uranium, and especially compounds of titanium, zirconium and chromium. These, and the variety of other catalysts of the Ziegler type, can be considered exemplified by the catalysts obtained by the interaction of a trialkylaluminum with titanium tetrachloride. Other catalysts of the Ziegler type differ from those disclosed in the above-mentioned Belgian Patent No. 533,362, in various ways, for example, as follows. Instead of or in addition to the aluminum trialkyls, catalysts of the type described in the Belgian patent can be made by reacting the various metal compounds of groups IV–B, V–B and VI–B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these of course being reacted with compounds of group IV–B, V–B or VI–B metals. Another Ziegler type catalyst is prepared by the interaction of an aluminum compound of the general formula $R_2AlX$ where R is a hydrocarbon radical such as alkyl or aryl, and X is a halogen, such as chlorine or bromine, with a compound of a metal of group VIII of the periodic system, e.g., iron, nickel, cobalt, or platinum, or manganese, for example dimethylaluminum monobromide plus ferric chloride, diisobutylaluminum chloride plus nickel (trivalent) chloride, diethylaluminum monochloride plus manganic chloride. Yet another combination is that of the group IV–B, V–B or VI–B metal compounds with aluminum compounds of the general formula $R_2AlX$, where R is hydrogen or a hydrocarbon radical, and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler type polymerization catalysts comprises compounds of the group IV–B, V–B and VI–B heavy metals as previously mentioned, combined with the alkali metal alkyls, for example with lithium-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc, for example butyl lithium plus zirconium tetrachloride, sodium tetramethylaluminum plus titanium tetrachloride or plus thorium acetylacetonate. Other Ziegler type catalysts are prepared by using (in conjunction with compounds of group IV–B, V–B and VI–B metals), instead of trialkylaluminums, triaryl-, triaralkyl-, trialkaryl- or mixed alkyl- and aryl- aluminum, zinc, magnesium or alkali metals, e.g., phenyl sodium plus $TiCl_4$.

Those skilled in the art having knowledge of these matters, refer to catalysts of the foregoing type as Ziegler or Ziegler-type catalysts, and to polymers prepared by their action as Ziegler or Ziegler-type polymers, the terms "Ziegler" and "Ziegler-type" being used synonymously. Ziegler catalysts of course are not to be understood as limited to those actually described by Professor Ziegler, any more than, for example, Friedel-Crafts catalysts are limited to those described by Friedel and Crafts; rather, the term Ziegler brings to mind a particular type of catalytic materials, some of which were earlier, are currently, and no doubt in the future will be, described by persons other than Ziegler and his associates. While the principal classes of such catalysts have been listed, this listing is not to be construed as complete, and various other such catalysts than those set forth may also be used to produce polymers. Thus, ethylene and other monomers can be polymerized by catalysts obtained by treating compounds of heavy metals, especially compounds of the group IV–B, V–B and VI–B metals, not with organometallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff method. Attention is further directed to the teaching of various of the foregoing catalysts in Ziegler's Belgian Patents 534,792 and 534,888, the disclosures of which are hereby incorporated herein by reference. Still another disclosure incorporated herein by reference is that of Belgian Patent 538,782 issued jointly to Montecatini Società Generale per l'Industria Mineraria e Chimica Anonima and Professor Dr. Karl Ziegler, disclosing the polymerization of olefins having at least 3 carbon atoms in the molecule, and their copolymerization with each other and with ethylene, using a variety of Ziegler catalysts; olefins, especially α-olefins disclosed in said Belgian Patent 538,782 include propylene, butylene, isobutylene, pentylene, hexylene, vinyl cyclohexene and styrene. Substantially the same disclosure is found in Australian patent application 9,651/55 now Australian Patent No. 211,963 also filed by Montecatini and Ziegler jointly. Catalysts of the said Belgian Patent 538,782 and Australian application 9651/55 are obtained by reaction of compounds of metals of the lefthand column of the 4th to 6th groups of the periodic table of elements, including the thorium and uranium groups, with metals, alloys, metal hydrides, or metalorganic compounds of metals of the 1st to 3rd groups of the periodic table. Yet another disclosure incorporated herein by reference is that of Ziegler's Australian patent application 13,453/55, opened to public inspection May 10, 1956, now Australian Patent No. 215,155, issued May 19, 1958, directed to polymerizing ethylene with catalysts comprising mixtures of organic compounds of the metals of groups I to III of the periodic system of the general formula $R_nMeX$, wherein R represents a hydrocarbon radical, X a hydrocarbon radical or halogen, Me a metal of groups I to III of the periodic system, and $n$ an integer which is less by one than the valency of the metal Me, with compounds of the metals of group VIII of the periodic system or of manganese.

It will be seen from the foregoing that a large variety of materials can be employed in the formation of a Ziegler catalyst. It is generally considered that the Ziegler catalysts are best obtained by interaction of a polyvalent metal compound with another metal in elemental or combined form resulting in reduction of the valence state of the first said metal. The polymetal Ziegler catalyst is believed to act as a heterogeneous catalyst, i.e., at least some of the product obtained by the interaction of the materials in question is present in solid form although often in such finely divided form as to be of colloidal or sub-colloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid.

The essence of the present invention, however, is not to be found in the particular Ziegler type catalyst employed but rather in the use of a thiophenol in the preparation of such catalyst, with consequent advantages when used to catalyze a variety of chemical reactions, polymerization of ethylenically unsaturated monomers being of particular interest.

ZIEGLER REACTIONS AND POLYMERS

Ziegler catalysts can be employed to catalyze a variety of chemical reactions, for example the chlorination of benzene to produce mono- and polychlorobenzenes, especially ortho- and paradichlorobenzene. The reaction of most intense commercial interest at the present time is polymerization. The present invention is broadly applicable to all Ziegler catalysts, and their use in all chemical reactions catalyzed thereby, and insofar as polymerization is concerned is broadly applicable to all Ziegler type polymers, i.e., all polymers prepared by polymerizing a monomer or mixture of monomers in the presence of a Ziegler type catalyst. A monomer which can be so polymerized can properly be called a Ziegler-polymerizable monomer. Of especial interest, of course, are those Ziegler solid polymers of sufficiently high molecular weight to be useful in the plastics industry, but benefits of the invention are obtainable in preparing lower molecular weight Ziegler semi-solid and even liquid polymers which can be used, for example, in adhesives, as lube oil additives, etc. The preferred polymers have a molecular weight of at least 2,000 and preferably 10,000. Those Ziegler polymers to which the preparation of the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution as described in the Journal für Praktische Chemie, 2nd Series, vol. 158, page 136 (1941), and J.A.C.S. 73, page 1901 (1951).

At the present time, ethylene is by far the preferred monomer for preparing Ziegler polymers. The ethylene can be homopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Serial No. 502,008, filed April 18, 1955. Also of interest are the copolymers of butadiene and/or isoprene with styrene, disclosed in the copending application of Carroll A. Hochwalt, Serial No. 501,795, filed April 18, 1955. Homopolymers of butadiene, homopolymers of isoprene, and copolymers of butadiene with isoprene, as prepared by the use of Ziegler type catalysts are also of great interest, having exceptional low temperature properties, as disclosed in the copending application of Robert J. Slocombe, Serial No. 502,189, filed April 18, 1955. Other ethylenically unsaturated hydrocarbons whose Ziegler polymers are of potential interest include propylene, butylenes, especially butene-1, amylenes and the like. Substituted olefins are also of interest, such as vinylcyclohexene, styrene, vinylnaphthalene, vinyl aromatic hydrocarbons generally, etc. Styrene when polymerized in the presence of Ziegler type catalysts gives a high molecular weight polymer showing a crystalline structure by X-ray diffraction examination. Ziegler type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers can also be prepared by the action of Ziegler catalysts, as disclosed in the copending application of Earl W. Gluesenkamp, Serial No. 507,717, filed May 11, 1955. A variety of copolymers of the various monomers named above with each other and with other comonomers can be prepared by Ziegler catalysis, and the present invention in its broadest scope includes all such an in fact all polymers prepared through the agency of Ziegler type catalysts on any single monomer or mixture of monomers polymerizable with such catalysts.

Despite the broad scope of the invention, it will be found more convenient in most of the present application to discuss the invention with specific reference to preferred embodiments thereof, and accordingly, Ziegler type polyethylene will be especially referred to by way of example. Likewise referred to especially by way of example will be catalysts prepared by the interaction of a trialkylaluminum with titanium tetrachloride, this being the preferred example of the preferred group of Ziegler catalysts which are those prepared by interaction of (a) an aluminum compound of the general formula $R_2AlX$ wherein R is an alkyl, cycloalkyl or aryl radical and X is hydrogen, halogen, or an alkyl, cyclo-alkyl or aryl radical, with (b) a metal halide selected from the group consisting of the chlorides, bromides and iodides of titanium and zirconium.

THE INVENTION IN FURTHER DETAIL

In accordance with preferred embodiments of the present invention an active Ziegler catalyst is prepared, usually but not always as a dispersion in an inert organic liquid, and there is added to such catalyst a thiophenol in an amount effective to modify the catalyst but insufficient to destroy its activity. An alternative, but less preferred, procedure comprises adding the thiophenol to a reducible polyvalent metal compound Ziegler-catalyst-precursor, and interacting the thus-treated precursor with a reducing agent effective to produce an active Ziegler catalyst. (The invention cannot be practiced by adding the thiophenol to the reducing agent rather than to the polyvalent reducible metal compound or to the active catalyst.) A suitable amount of a thiophenol will vary somewhat dependent upon the particular catalyst and reaction conditions and these amounts will be discussed in detail hereinafter, but in general the amount is in the neighborhood of one gram-mole of the thiophenol per gram-atom of the multivalent metal in the metal compound that is reduced in preparing the catalyst, e.g., $TiCl_4$. Depending upon the circumstances, the amount may be considerably less than one gram-mole per gram-atom of the said metal, or the gram-moles of the thiophenol may be one or two or not exceeding a few times the number of gram-atoms of said metal. Too little of a thiophenol in ineffective, but on the other hand not very much can be used or the catalyst will be deactivated, i.e., its catalytic activity will be destroyed. It appears that any amount of a thiophenol decreases the catalytic activity somewhat, but in some instances this is not undesirable and in other instances in accordance with preferred aspects of the invention, I readily overcome this effect partially or completely by alteration in reaction conditions, especially by imposing moderate pressure. It also appears that in general any amount of thiophenol causes a decrease in molecular weight of polymer obtained by use of the thus-treated Ziegler catalyst. Here again, in many instances this is not objectionable or is even desirable, while in other instances in accordance with preferred aspects of the invention I overcome this effect partially or completely by increasing the ratio of the reducing component of the catalyst to the multivalent metal component which is reduced.

Polymers made with catalysts modified in accordance with the present invention have neither their initial color nor their heat stability impaired, and in fact the good initial color and especially the good color exhibited by the polymers after having been subjected to heating, such as mechanical working at high temperatures, is an advantage of the practice of the present invention.

Thiophenols as a class are employed in practicing the invention. By a thiophenol I mean any compound having the formula Aryl-SH wherein aryl is a radical jointed to —SH through aromatic carbon and is free from non-interfering substituents. Included amongst the preferred thiophenols are especially those having a single —SH group, and also those having a plurality such as 2 or 3 or more —SH groups, attached to aromatic carbon. While a variety of non-interfering substituents can be present, I prefer thiophenol per se, i.e., benzenethiol, and hydrocarbon-substituted thiophenols wherein the hydrocarbon substituents on the benzene ring of thiophenol may be aliphatic, alicyclic, aromatic and mixed groups such as alkaryl, aralkyl, cycloalkylaryl and the like and/or the hydrocarbon substituent can be a ring fused with a benzene ring as in such compounds as the thionaphthols and hydrocarbon-substituted thionaphthols. Such compounds having additional —SH groups attached to aromatic carbon also constitute a preferred class of compounds and these can be defined as the group consisting of the monosulfhydril- and polysulfhydril-substituted benzenes and hydrocarbon-substituted benzenes. It is generally preferred that a thiophenol employed in the invention contain not over 15 carbon atoms per molecule and not over two sulfhydril, i.e., —SH groups per molecule. It may be mentioned that salts of thiophenols, i.e., thiophenols wherein sodium, calcium, ammonium, or other cation replaces the H of an —SH group, may find use, but this is seldom practical because of problems of insolubility and lack of hydrolysis to provide an active hydrogen atom of a sulfhydril group.

By way of example, but not limitation, of suitable thiophenols that can be employed in the practice of the invention, the following are mentioned: thiophenol (per se); the thiocresols, i.e., o-, m-, and p-(methyl)thiophenol and mixtures thereof; the alkylated thiocresols, e.g., 2,4-(dimethyl)thiophenol, 2-methyl-4-(t-butyl)thiophenol, 2-t-butyl-4-(methyl)thiophenol, 2 - methyl-4-(n-butyl)thiophenol, 2 - methyl-4-(sec-butyl)thiophenol, 2-methyl-4-(isobutyl)thiophenol, 3,4-(dimethyl)thiophenol, 2-methyl-5 - (ethyl)-thiophenol, 2 - methyl - 4 - (cyclohexyl)thiophenol, 2-methyl - 4 - (benzyl)-thiophenol; o-(isopropyl) thiophenol; m-(ethyl)thiophenol; p-(n-amyl)-thiophenol; 3-n-propyl-4-(n-hexadecyl)thiophenol; 4 - methoxythiophenol; thiosalicylic acid which can also be called o-sulfhydrilbenzoic acid; dithiopyrocatechol which can also be called o-disulfhydrilbenzene or o-benzenedithiol; monothiopyrocatechol which can also be called o-sulfhydrilphenol; alkylated monothio- and dithiopyrocatechols, e.g., 1-hydroxy-2-sulfhydril-4-methylbenzene; 1,2-disulfhydril-4-methylbenzene, 1,2-disulfhydril-3,5-diisopropylbenzene; the unsubstituted and substituted mono- and dithioresorcinols, e.g., m-sulfhydrilphenol, m-disulfhydrilphenol, m-ethoxydithioresorcinol; the unsubstituted and substituted mono- and dithiohydroquinones; the unsubstituted and substituted mono-, di- and trithiopyrogallols, e.g., 1,2-dihydroxy-3-sulfhydrilbenzene, 5-ethyltrithiopyrogallol; p-sulfhydrilbiphenyl which can also be called p-(phenyl) thiophenol; products obtained by converting to —SH groups the —OH group or groups present on hydrolysates of mono- and polychlorinated biphenyls; α-thionaphthol; β-thionaphthol; mixed amyl thionaphthols; 2-sulfhydrilanthracene; 2,4-dichlorothiophenol; nitrothiophenol; α-sulfhydril-β-naphthol; m-(methylsulfonyl)benzenethiol; o-(methylsulfinyl)benzenethiol; p-(methylthio)benzenethiol; the various thiophenols having substituted on aromatic carbon one or more halogen, e.g., —Cl, —Br, —I, —F, or ester, or amide, or sulfonamide groups wherein the nitrogen of amide or sulfonamide groups can be unsubstituted or can be substituted by one or two hydrocarbon radicals.

The amount of a thiophenol to be employed is best related to the amount of catalyst, and will vary considerably dependent upon the particular catalyst, its method of preparation, the particular thiophenol, and the extent to which catalyst modification is desired. However, the amount of a thiophenol to be used is always small, and an amount will be chosen effective to modify the catalyst but insufficient to decrease its activity to an undesirable extent and certainly insufficient to destroy the catalyst activity completely. Ziegler catalysts can be made up of compounds of polyvalent metals which are reduced by reducing agents, the former being exemplified by TiCl$_4$ and the latter being exemplified by trialkylaluminums. For each mole of the said polyvalent metal compound which is reduced, when the said compound contains one atom of metal per molecule, the amount of a thiophenol to be used will generally be within the range of 0.1 to 2 moles. The optimum range, and even the operable range, in a given situation may be considerably smaller than this stated range. In some instances the range of optimum or operable proportions will be outside these stated ranges. However, it is a matter of the simplest of tests to determine operable and optimum quantities of any given thiophenol with any given Ziegler catalyst. Such test can, for example, be carried out as described in the specific examples hereinafter, and having had the benefit of the present disclosure, they are well within the skill of the art. With Ziegler catalysts prepared by the interaction of a trialkylaluminum with titanium tetrachloride, and with thiophenol per se, i.e., benzenethiol, there is almost always used an amount of said thiophenol within the range of from 0.1 to 1.5 moles per mole of TiCl$_4$ used, i.e., per gram atom of titanium.

When Ziegler catalyst prepared in accordance with the present invention is used as a polymerization catalyst, the molecular weight of the resulting polymer is ordinarily lower than the molecular weight would be if a thiophenol had not been used in preparing the catalyst and the polymerization carried out under otherwise identical conditions. In many instances this is very desirable, as when monomer, catalyst and reaction conditions are chosen to give polymers having desirable properties but whose molecular weights are somewhat higher than desired for a given purpose. However, if it is desired to overcome the effect of the chosen thiophenol in lowering the molecular weight of the polymer product, I increase the mole ratio of reducing agent to metal compound to be reduced, e.g., the mole ratio of a trialkylaluminum to a titanium salt used in preparing the catalyst. This increase in mole ratio results in a polymer having a higher molecular weight than would be the case if all other conditions were identical except for a lower mole ratio. Thus, for example, when polymerizing ethylene with a catalyst prepared by the interaction of a trialkyl-aluminum with titanium tetrachloride in a R$_3$Al/TiCl$_4$ mole ratio of from 0.3:1 to 0.5:1, but using thiophenol to increase the density of the polyethylene product, I can obtain the same high molecular weight as would be obtained in the absence of the thiophenol if I use a higher R$_3$Al/TiCl$_4$ mole ratio, say in the range of 0.5:1 to 0.8:1.

Use of a thiophenol tends to decrease the activity of the catalyst. As already pointed out, the amount of thiophenol must be limited so that this decrease in activity does not occur to an extent that is undesirable, all other things being considered, and certainly must be limited so that the catalyst activity is not destroyed. Further, an increase in the mole ratio discussed in the preceding paragraph, such as the mole ratio of trialkylaluminum to TiCl$_4$, also tends to decrease the activity of the catalyst. In either case the activity of the catalyst can be noted by the rate at which ethylene is polymerized or other reaction is effected by the aid of the catalyst in a comparison of said rate with the rate where the thiophenol is not used and/or the said mole ratio is not increased. Decreased catalyst activity, which results in a decreased rate of reaction, can be compensated for by a change in certain reaction variables such as by increasing the amount of catalyst or increasing the pressure. I usually much prefer to increase the pressure, because this does not significantly affect the character of the reaction or product, other than to speed the reaction. I found that a very modest increase in pressure, say from atmospheric up to 50 or 100 or 200 pounds per square inch gauge, is usually quite sufficient to obtain adequate reaction rate. In the case of catalysts which require pressure in the first instance for a satisfactory rate of polymerization when being used to polymerize ethylene or other monomer, the pressure can be still further increased to restore the reaction rate which has decreased because of the use of a thiophenol and/or an increase in the mole ratio of reducing agent to polyvalent metal compounds employed in preparing the catalyst.

I ordinarily prefer to prepare an active Ziegler catalyst as a dispersion in an inert organic liquid, such as an aliphatic or aromatic hydrocarbon as will be discussed more in detail hereinafter. This dispersion is ordinarily a colloidal suspension of catalyst particles in the liquid. I then add the chosen thiophenol in the chosen amount, and preferably the thiophenol before addition is diluted somewhat with an inert organic liquid and the addition made with vigorous agitation so as to prevent localized concentration of thiophenol during the treatment of the catalyst therewith. It is necessary in accordance with the presently preferred practice of the invention to prepare an active Ziegler catalyst first, and then to treat same with the chosen thiophenol. To treat the reducing agent, such as the trialkylaluminum, first with thiophenol and then add the polyvalent metal compound, e.g., TiCl₄, tends to give an almost inactive or completely inactive catalyst and furthermore use of such a catalyst if active at all does not result in the improvements in the polymer which are desired. It is permissible, however, to add the thiophenol first to the multivalent metal compound, e.g., TiCl₄, prior to its interaction with the reducing agent, e.g., trialkylaluminum, although the proportions of materials used generally lie within a narrower range. Ordinarily the monomer is polymerized in the presence of the catalyst dispersion which has been treated with a thiophenol. However, prior to the polymerization or other use of the catalyst, part or all of the solvent may be removed as by filtration, evaporation, and the like, care being taken not to use conditions for such a separation that will deactivate the catalyst. It is also possible, if a dry catalyst or catalyst in a reduced amount of organic liquid, is to be used, to prepare the active catalyst in such form prior to its treatment with a thiophenol. In such event, particular care must be taken to insure through admixture of the chosen amount of thiophenol with the total catalyst, and this can involve using a limited amount of inert organic liquid as a solvent and/or suspending agent for the chosen thiophenol, or thorough grinding as by ball milling the catalyst, either in a dry condition or with some inert organic liquid present, with the chosen thiophenol.

Ordinarily, it is quite sufficient and in fact desirable to use only a single thiophenol compound. However, it is not outside the scope of the invention to utilize an admixture of two or more such compounds, or in admixture of any one or more such compounds with any other catalyst modifying agent that may be desired.

DETAILS OF PREPARATION AND USE OF ZIEGLER CATALYSTS

More detailed information will now be given on preferred procedures and components for preparing various Ziegler catalysts, and it will be understood that the procedures given above with respect to use of a thiophenol will be followed. Ziegler catalysts, for whatever use desired, can be prepared in the vessel in which the catalyzed reaction is to be carried out, or can be prepared in one vessel and then transferred to the intended reaction vessel, and in either event can be either be used immediately after preparation, or after a period of time elapses between the preparation of the catalyst and its subsequent use to catalyze, e.g., polymerization. If the catalyst is to be used after such a period of time, it is apt to lose activity during storage period and/or produce polymer of an increased molecular weight as compared with that produced with fresh catalyst and these disadvantages can be minimized by storing Ziegler catalyst at temperatures below about 10° C., and preferably below —25° C. for fairly long storage periods, as disclosed and claimed in the copending application of Robert J. McManimie, Harry G. Hurst and Edward H. Mottus, Serial No. 586,352, filed May 22, 1956. While Ziegler catalysts are often conveniently prepared at room temperature, they can be prepared at higher temperatures, and also certain advantages are obtained, including uniform catalyst activity over the course of a reaction period and more effective removal of catalyst residues, if the catalyst is prepared at temperatures below about —25° C. as disclosed and claimed in the copending application of Robert J. McManimie, Harry G. Hurst and Edward H. Mottus, Serial No. 586,353, filed May 22, 1956.

I prefer catalysts prepared by the interaction of (a) an aluminum compound of the general formula R₂AlX wherein R is an alkyl, cycloalkyl or aryl radical and X is hydrogen, halogen, or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminums, e.g., triethylaluminum, triisobutylaluminum, trioctylaluminum, with titanium tetrachloride.

Suitable aluminum compounds to be reacted with the chlorides, bromides and iodides of titanium or zirconium are those represented by the general formula R₂AlX wherein R is an alkyl, cycloalkyl or aryl radical and X is hydrogen, halogen, or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-(β-phenylethyl)aluminum
Diethylaluminum chloride
Diisobutylaluminum chloride
Diisobutylaluminum iodide
Di(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as R₂AlCl plus RAlCl₂, termed alkylaluminum sesquihalides.

The aluminum compounds in question are interacted with one or more chlorides, bromides, or iodides of titanium or of zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, K₂TiF₆, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mole ratio of aluminum compound to titanium (or zirconium) compound, or stated another and simpler way, the mole ratio of aluminum to titanium (or zirconium), can vary over a wide range, suitable values being from 0.1:1 to 10:1 on up to 15:1 or higher. It is generally preferred to use an Al:Ti mole ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, or vice versa, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied propane, isobutane, normal butane, n-hexane, the various isomeric hexanes, n-heptane, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, any of the xylenes, cumene, decalin, ethylene dichloride, chlorobenzene, diethyl ether, o-dichlorobenzene, dibutyl ether, tetrahydrofuran, dioxane. In some instances it is also advantageous to prepare the catalyst in the presence of a monomer; for example if the catalyst is prepared in the presence of monomeric styrene, and then used to polymerize styrene, a high proportion of crystalline polystyrene results.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed), per 1 part by weight total polymer produced, solvent recovery steps are obviated or minimized wth consequent advantage. It is often helpful in obtaining efficient contact between monomers and catalysts and in aiding removal of heat of reaction, to employ larger amounts of solvent, for example from 5 to 30 parts by weight solvent per 1 part by weight total polymer produced. These inert solvents, which are solvents for the monomers, some of the catalyst components, and some of the polymers, but are non-solvents for many of the polymers, e.g., polyethylene, can also properly be termed inert liquid diluents, or inert organic liquids.

The amount of catalyst required is dependent on the other variables of the particular reaction, such as polymerization, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should usually be at least about 0.001:1, and much lower values, such as 0.0001:1 can sometimes be used.

The polymerization can be effected over a wide range of temperatures, again the particular preferred temperature being chosen in accordance with the monomer, pressure, particular catalyst and other reaction variables. For many monomers from room temperature down to say minus 40° C. and even lower are suitable, and in many cases it is preferred that the temperature be maintained at below about 35° C. However, for other monomers, particularly ethylene, higher temperatures appear to be optimum, say from 50 to 75° C. for ethylene. Temperatures ranging up to 100° C. and higher are generally satisfactory for Ziegler type polymerization.

The pressure at which the polymerization is carried out is dependent upon the chosen monomer or monomers, as well as other variables. In most instances, the polymerization is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and in some instances on polymer quality. The choice of whether or not to use an appreciably elevated pressure will be one of economic and practical considerations taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like, although the extent to which a given quantity will inhibit catalyst activity will be greatly dependent on the particular material. For this reason, suitable precautions should be taken to protect the catalyst and the reaction mixture from such materials. An excess of the aluminum compound, particularly mole ratios of aluminum to titanium or zirconium in excess of about 4:1, tends to give a certain amount of protection against these poisons. The monomers and diluents or solvents, if used, need not be pure so long as they are reasonably free from poisons. It is well to protect the catalyst during preparation, storage, and use by blanketing with an inert gas, e.g., nitrogen, argon or helium.

The monomer or mixture of monomers is contacted with the catalyst in any convenient manner, preferably by bringing the catalyst and monomer together with intimate agitation provided by suitable stirring or other means. The agitation can be continued during the polymerization, or in some instances the polymerization mixture can be allowed to remain quiescent while the polymerization takes place. In the case of the more rapid reactions with the more active catalysts, means can be provided for refluxing monomer and solvent if any of the latter is present, and thus remove the heat of reaction. In any event adequate means should be provided for dissipating the exothermic heat of polymerization. If desired, the monomer can be brought in vapor phase into contact with the solid catalyst, in the presence or absence of liquid solvent. The polymerization can be effected in the batch manner, or in a continuous manner, such as for example, by passing the reaction mixture through an elongated reaction tube which is contacted externally with suitable cooling medium to maintain desired reaction temperature.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture, or the polymer after separation from solvent, etc., with methanolic hydrochloric acid, with an aliphatic alcohol such as methanol, isobtuanol, secondary butanol, or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a non-solvent, such non-solvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

The foregoing principles and procedures can be applied, with suitable modifications when necessary, to reactions other than polymerizations, effected in the presence of Ziegler catalysts modified with a thiophenol in accordance with the present invention.

In order to illustrate some of the various aspects and advantages of the invention, the following examples are given. Ethylene has been chosen as a representative monomer, triisobutyl-aluminum has been chosen as a representative reducing agent in preparing the catalyst, titanium tetrachloride has been chosen as a representative polyvalent metal compound that is reduced in preparing the catalyst, kerosene has been chosen as a representative inert organic liquid for preparation of the catalyst dispersion and in which to carry out the polymerization, and benzenethiol, i.e., thiophenol itself, has been chosen as a representative thiophenol. It will of course be understood that variations from the particular catalyst components, reactants, catalyst modifiers, solvents, proportions, temperatures and the like can be made without departing from the invention.

EXAMPLES

The catalyst preparations and ethylene polymerizations detailed in Table I include operations at varying conditions employing the present invention, and as a basis for comparison also include control runs made without employing the invention.

Catalyst was prepared as a slurry in a kerosene which had been highly purified by extensive acid washing. All equipment was thoroughly cleaned and dried, and was thereafter maintained free from oxygen and moisture by being flushed with lamp-grade nitrogen. In most instances, the chosen amount of titanium tetrachloride was added dropwise to a solution of the chosen amount of triisobutyl aluminum in kerosene. The material was highly agitated during this formation of the catalyst. Polymerization of ethylene with the catalyst dispersion was started within 15 minutes of the time the catalyst preparation had been completed, with one exception noted. Unless otherwise stated, the chosen amount of thiophenol was added to the vigorously agitated catalyst slurry just prior to the start of the ethylene polymerization.

Polymerizations at atmospheric pressure were carried out in a 2-liter flask equipped with a high speed stirrer, means for maintaining a nitrogen flush, and means for introducing ethylene gas. Runs at superatmospheric pressure were carried out in a stirred autoclave. The charge of catalyst suspension in kerosene was 1 liter in the case of atmospheric pressure runs, and 500 ml. in the case of autoclave runs.

The polymerizations were carried out at 70–80° C.

Quantities and proportions of the catalyst components are described by stating the mole ratio of triisobutyl aluminum to $TiCl_4$, which, of course, is also the mole ratio or atomic ratio of aluminum to titanium, and by stating the concentration of titanium in millimoles per liter of kerosene, i.e., milli-gram moles $TiCl_4$ or milli-gram atoms of Ti per liter of kerosene. The amount of thiophenol used is expressed as millimoles thiophenol per liter of kerosene, and also as mole ratio of thiophenol to titanium, i.e., gram moles thiophenol per gram mole $TiCl_4$ or per gram atom Ti.

Ethylene was fed to the reactors at a rate at least as fast as it was taken up by polymerization.

At the end of the polymerization period, which was usually 60 minutes, ethylene flow was stopped, the reactor flushed with nitrogen, and the catalyst "quenched" by addition of anhydrous isobutanol. The reaction mixture was then filtered to separate the suspended polyethylene from the liquid, the polyethylene was then worked up by heating in additional isobutanol, filtered, washed with further amounts of isobutanol and hexane and finally dried.

The specific viscosity of the polymer, which is a function of the molecular weight, the higher the viscosity the higher the molecular weight, was determined on a solution of 0.1 weight percent polymer in xylene at 100° C. The density and the tensile properties were obtained on compression molded test specimens. The flow properties of the polyethylene were determined (ASTM D-1238-52T) by forcing a molten polymer at a temperature of 190° C. through a small orifice and reported as the melt index, i.e., the extrusion rate in grams polymer per 10 minutes (decigrams/min.).

Since the addition of thiophenol reduces the activity of Ziegler catalysts, but this activity can be restored by various means, especially by somewhat increasing the pressure, an approximation of catalyst activity was made. This is described as rate of ethylene take-up in grams/

*Table I*

| Run | Pressure, p.s.i.g. | Thiophenol mmols/l. | Thiophenol mol ratio to Ti | Catalyst Ti/l. | Catalyst Al/Ti, mol ratio | Density, g./cc. | Strength, p.s.i. yield/break | Elong., percent yield/break | Melt index, dg./min. | Sp. Visc. | Ethylene Take-up rate, g./hr./l. |
|---|---|---|---|---|---|---|---|---|---|---|---|
| A (Control) | 0 | 0 | 0 | 20 | 0.5 | 0.9417 | 3,273/1,980 | 18/588 | 0.3 | 0.199 | 140 |
| B | 0 | 2 | 0.1 | 20 | 0.5 | 0.9432 | 3,409/1,833 | 10/536 | 0.8 | 0.197 | 140 |
| C | 0 | 10 | 0.5 | 20 | 0.5 | 0.9494 | 3,914/1,820 | 13/568 | 0.5 | 0.216 | 120 |
| D | 0 | 15 | 0.75 | 20 | 0.5 | 0.9535 | 4,242/1,826 | 13/190 | 0.8 | 0.137 | 70 |
| E [1] | 0 | 15 | 0.75 | 20 | 0.5 | 0.9539 | 4,797/1,858 | 10/145 | 2.1 | 0.135 | 90 |
| F | 0 | 20 | 1.0 | 20 | 0.5 | 0.9498 | —/1,333 | —/1 | 12.9 | 0.096 | 40 |
| G (Control) | 100 | 0 | 0 | 20 | 0.5 | 0.9477 | 3,803/1,561 | 12/276 | 1.8 | 0.125 | 700 |
| H | 100 | 15 | 0.75 | 20 | 0.5 | 0.9604 | —/3,201 | —/2 | 16.5 | 0.099 | 270 |
| I | 100 | 20 | 1.0 | 20 | 0.5 | 0.9631 | —/2,918 | —/6 | 22.4 | 0.097 | 120 |
| J | 100 | 25 | 1.25 | 20 | 0.5 | 0.9498 | —/2,622 | —/8 | 43.1 | 0.088 | 100 |
| K | 100 | 30 | 1.5 | 20 | 0.5 | 0.9654 | Too brittle | | 54.1 | 0.079 | 100 |
| L | 100 | 25 | 1.25 | 20 | 0.6 | 0.9648 | —/3,938 | —/8 | 15.6 | 0.097 | 120 |
| M | 100 | 15 | 0.75 | 20 | 0.6 | 0.9556 | 4,333/2,495 | 12/587 | 0.2 | 0.200 | 200 |
| N | 100 | 15 | 0.75 | 20 | 0.65 | 0.9549 | 4,344/2,182 | 13/587 | 0.1 | 0.198 | 200 |
| O | 100 | 15 | 0.75 | 20 | 0.7 | 0.9542 | 4,326/2,352 | 11/472 | Too hard | 0.265 | 140 |
| P | 100 | 25 | 1.25 | 20 | 0.65 | 0.9664 | Insufficient polymer | | | 0.089 | 16 |
| Q [2] (Control) | 0 | 0 | 0 | 20 | 0.5 | 0.9432 | 3,302/1,885 | 15/592 | 0.21 | 0.197 | 140 |
| R [3] | 0 | 15 | 0.75 | 20 | 0.5 | 0.9535 | 4,129/1,776 | 12/190 | 1.2 | 0.192 | 100 |
| S [4] | 0 | 15 | 0.75 | 20 | 0.5 | 0.9536 | 4,080/1,673 | 13/222 | 1.9 | 0.133 | 110 |
| T [5] | 0 | 15 | 0.75 | 20 | 0.5 | 0.9431 | 4,080/2,607 | 14/473 | 0.02 | 0.280 | 30 |
| U [5] | 0 | 10 | 0.5 | 20 | 0.5 | 0.9497 | 3,953/2,418 | 16/719 | 0.2 | 0.210 | 100 |
| V [6] | 0 | 15 | ——— | 20 | 0.5 | 0.9439 | Insufficient polymer | | | 0.341 | 5 |

[1] Different agitator.
[2] "Reverse" catalyst mixing, i.e., triisobutylaluminum added to $TiCl_4$.
[3] "Reverse" catalyst mixing, i.e., triisobutylaluminum added to $TiCl_4$; thiophenol added at 12 minutes after preparing catalyst, ethylene started at 15 minutes.
[4] "Reverse" catalyst mixing, i.e., triisobutylaluminum added to $TiCl_4$; thiophenol added at 58 minutes after preparing catalyst, ethylene started at 60 minutes.
[5] Thiophenol added to $TiCl_4$ in kerosene, then triisobutylaluminum added.
[6] Thiophenol added to triisobutylaluminum in kerosene, then $TiCl_4$ added.

hour/liter. Since this rate also depends on mechanical factors, i.e., reactor geometry, agitation, etc., the values given are only relative.

In studying the data in Table I, the principal variables to be noted are the pressure, the amount of thiophenol, and the mole ratio of aluminum to titanium used in making the catalyst, while the principal properties to be noted are the density, the tensile yield strength, the molecular weight as reflected in the melt index and specific viscosity, and the catalyst activity.

Runs A–F were made at atmospheric pressure, with increasing quantities of thiophenol. These amounts range from zero for control on A, to 0.1 mole ratio thiophenol to titanium in run B, up to 1.0 thiophenol/titanium mole ratio. It will be seen that a mole ratio of 0.1 gave at most but a slight increase in density, tensile yield strength and melt index of the polyethylene product. A thiophenol/titanium mole ratio of 0.5 was sufficient to bring the density to 0.95 and the tensile yield strength to 3914 p.s.i. Increase in mole ratio to 0.75 (runs D and E) brought the density well above 0.95 and the tensile yield strength above 4200 p.s.i., and the molecular weight was reduced further to a melt index range which is often desirable. No particular differences are noted between runs D and E in which different agitators were used, except for the rather marked difference in tensile yield strength and melt index. Further increase in the thiophenol/titanium mole ratio to 1.0 (run F) still maintained the density at about 0.95, but the tensile properties have worsened rather markedly, and the melt index is rather high for most purposes. Thus, at these particular conditions the range of thiophenol/titanium mole ratios between 0.1 and 1.0 covers the preferred operations.

It may be further stated with respect to runs B–F, that the activity of the catalyst decreased with these runs so the catalyst efficiency became undesirably low with the largest amount of thiophenol.

Runs G–K were carried out at 100 p.s.i. gauge pressure, resulted in considerably improved catalyst efficiency over the earlier runs at atmospheric pressure, and also permitted the use of more thiophenol with a resultant still further increase in density of the polyethylene. Thus, at these conditions thiophenol/titanium mole ratios of 0.75 to 1.5 were quite effective and gave polymers having density of 0.96 and above. However, the highest mole ratio resulted in polymer having such a low molecular weight that tensile property tests could not be carried out. At these conditions, thiophenol/titanium mole ratios within the range of 0.75 to 1.25 appear optimum. For many purposes, however, the molecular weight of the polymer is too low, but this can be corrected by increasing the aluminum/titanium mole ratio.

This was done in runs L–P. These runs were carried out at 100 p.s.i.g. and thiophenol/titanium mole ratios of 0.75 to 1.25, and thus these conditions largely corresponded to those employed in runs H–K above. However, they show that increasing the aluminum/titanium mole ratio from 0.5 in those runs up to 0.6, 0.65 and 0.7, results in the production of high density polyethylene with a much greater molecular weight. It will also be noted that the tensile yield values were excellent with this combination of conditions.

The preceding runs were made and the catalysts prepared by adding TiCl₄ to a solution of triisobutylaluminum in kerosene. Run Q is a control run without thiophenol, in which the reverse order of addition was used for preparing the catalyst, that is the TiCl₄ to be used was dissolved in kerosene and thereafter the triisobutylaluminum was introduced into the solution. The catalyst produced appeared normal, and the polymerization proceeded as usual. However, upon quenching the final reaction mixture with isobutanol at 60–70° C., the mixture immediately turned blue-white, i.e., there resulted a blue solution and a white polymer, rather than the usual tan or brown color. Filtration on an open filter and washing with hot isobutanol left a perfectly white polymer. The polymer so treated when milled and compression molded at 170° C. has an excellent color, and its color is often appreciably better than a polymer prepared in the same manner but with a catalyst made by addition of the TiCl₄ to the triisobutylaluminum. This same principle holds true in general with the various Ziegler catalysts, when the reducing component of the catalyst is added to the polyvalent metal component, rather than vice versa. The result noted with respect to the color of the mother liquor and polymer was retained in runs R and S which were made by the same "reverse" catalyst addition procedure, with thiophenol being added to the thus-prepared catalyst. It will be seen that the effects obtained with thiophenol as described in runs P and earlier were likewise obtained in runs R and S.

Runs T and U were made with catalysts which were prepared by first adding the thiophenol to the TiCl₄ and kerosene, then adding triisobutylaluminum. This procedure is more sensitive to the amount of thiophenol, and thus in general is less desirable than when the thiophenol is added after interaction of the TiCl₄ with the aluminum alkyl as in the earlier runs. Run T, with a thiophenol/titanium mole ratio of 0.75, yielded polymer of only slightly increased density, but with a good tensile yield point; catalyst activity was poor. Run U, with a thiophenol/titanium mole ratio of 0.5, differs little from its counterpart run C.

In run V, the thiophenol was added to the triisobutylaluminum and kerosene first, and then the TiCl₄ was added. This presumably resulted in the formation of diisobutylphenylthioaluminum, to react with TiCl₄. This catalyst showed practically no activity, and the small amount of polymer formed was of ordinary density and extremely high molecular weight. Thus, the results of the present invention are not attainable by this procedure.

Another run, not set forth in Table I, is of interest, and details follow. It has been stated elsewhere that in preparing catalysts useful for polymerizing ethylene, instead of trialkylaluminums one can use compounds of the general formula $R_2AlX$ in which X is the radical of a secondary amine, secondary acid amide, mercaptan, thiophenol or a carbonic or sulfonic acid. Run V, discussed above in Table I, demonstrated that reacting thiophenol with triisobutylaluminum, and thereafter adding TiCl₄, gave a catalyst of very little activity and the polyethylene obtained by use of this catalyst had ordinary density. It was thought, however, that it would be of interest to duplicate an example given elsewhere in which ethylmercaptodiethylaluminum was pre-prepared, and then reacted with TiCl₄ to form a catalyst used for polymerizing ethylene. This was done as follows, and will be termed run W.

RUN W

Ethylmercaptodiethylaluminum was prepared as follows: With stirring and exclusion of air and moisture, one mole ethylmercaptan was added slowly at room temperature to one mole triethylaluminum. Immediately, with spontaneous heating of the mixture, the corresponding amount of ethylene was evolved. After briefly reheating, by distillation in a vacuum at 160° C. and an absolute pressure of 12 mm. of mercury, ethylmercaptodiethylaluminum was obtained as a colorless mobile liquid. The elemental analysis of this material corresponds accurately with that for ethylmercaptodiethylaluminum. A catalyst was then prepared by reacting ethylmercaptodiethylaluminum with titanium tetrachloride in a mole ratio of the former to the latter of 10.2/1 in hexane, the total amounts used giving a concentration of 156 millimoles of titanium per liter.

Ethylene was polymerized using the catalyst suspension in an autoclave at 250 to 600 p.s.i.g., at a temperature of from 20-64° C. The rate of ethylene polymerization, and the yield of polyethylene, were quite low, especially considering the high pressure used. Properties of the polymer were:

| | |
|---|---|
| Density, g./cc. | 0.9428 |
| Tensile strength, p.s.i.: | |
| Yield | — |
| Break | 3208 |
| Tensile elongation, percent: | |
| Yield | — |
| Break | 18 |
| Melt index | Too hard |
| Specific viscosity | Insoluble |

It will be seen that the results are much like those of run V above wherein thiophenol was first reacted with triisobutylaluminum and then $TiCl_4$ added to make the catalyst, in that the density is not appreciably elevated, the yields are poor, and the polymer is of very high molecular weight.

While the invention has been described with particular reference to preferred embodiments thereof, it will be appreciated that variations from the details given herein can be effected without departing from the invention in its broadest aspects.

I claim:
1. A method which comprises reacting a trialkylaluminum with titanium tetrachloride in an inert organic liquid to form an active Ziegler catalyst dispersion, adapted for the low-pressure polymerization of ethylene, and then adding thereto a modifying amount of a thiophenol insufficient to destroy the catalyst activity.

2. Ziegler catalyst, adapted for the low-pressure polymerization of ethylene, prepared by the method of claim 1.

3. A method which comprises reacting a trialkylaluminum with titanium tetrachloride in a mole ratio of from 0.3:1 to 0.8:1 in an inert organic liquid to form an active Ziegler polymerization catalyst dispersion, adapted for the low-pressure polymerization of ethylene, and then adding thereto thiophenol in an amount of from 0.1 to 1.5 moles per mole of titanium tetrachloride used.

4. A method which comprises treating titanium tetrachloride with thiophenol in an amount such as to result in the subsequent production of a modified but active Ziegler polymerization catalyst, adapted for the low-pressure polymerization of ethylene and interacting the thus-treated titanium tetrachloride with a trialkylaluminum to produce an active Ziegler polymerization catalyst, adapted for the low-pressure polymerization of ethylene.

5. A method which comprises forming an active Ziegler polymerization catalyst dispersion, adapted for the low-pressure polymerization of ethylene, by the interaction, in an inert organic liquid, of (a) an aluminum compound of the general formula $R_2AlX$ wherein R is selected from the class consisting of alkyl, cycloalkyl and aryl radicals and X is selected from the class consisting of hydrogen, halogen, alkyl, cycloalkyl and aryl radicals, with (b) a metal halide selected from the group consisting of the chlorides, bromides and iodides of titanium and zirconium, then adding thiophenol thereto, then polymerizing ethylene in the presence of said dispersion, the amount of thiophenol being such as to result in the production of polyethylene having a density of at least 0.95.

6. A method for making high density high molecular weight polyethylene which comprises polymerizing ethylene at superatmospheric pressure in the presence of a Ziegler polymerization catalyst dispersion, adapted for the low-pressure polymerization of ethylene, prepared by the interaction, in an inert organic liquid, of a trialkylaluminum with titanium tetrachloride in a mole ratio of from 0.5:1 to 0.8:1, said catalyst after its preparation in active form having been treated with thiophenol in an amount of from 0.1 to 1.5 moles per mole of titanium tetrachloride used.

7. In a method for preparing a Ziegler polymerization catalyst, adapted for the low-pressure polymerization of ethylene, wherein the catalyst is prepared by the interaction of (a) an aluminum compound of the general formula $R_2AlX$ wherein R is selected from the class consisting of alkyl, cycloalkyl and aryl radicals and X is selected from the class consisting of hydrogen, halogen, alkyl, cycloalkyl and aryl radicals, with (b) a salt of a group IV-B to group VI-B metal, the improvement comprising treating a material selected from the group consisting of said salt and said catalyst with a thiophenol in an amount effective to modify the catalyst but insufficient to destroy its activity.

8. In a method for preparing a Ziegler polymerization catalyst, adapted for the low-pressure polymerization of ethylene, wherein the catalyst is prepared by the interaction of (a) an aluminum compound of the general formula $R_2AlX$ wherein R is selected from the class consisting of alkyl, cycloalkyl and aryl radicals and X is selected from the class consisting of hydrogen, halogen, alkyl, cycloalkyl and aryl radicals, with (b) a salt of a group IV-B to group VI-B metal, the improvement comprising treating said catalyst with a thiophenol in an amount effective to modify said catalyst but insufficient to destroy its activity.

9. The method of claim 8 wherein said thiophenol is a hydrocarbon substituted thiophenol.

10. Ziegler polymerization catalyst, adapted for the low-pressure polymerization of ethylene, prepared by the method of claim 8.

11. A method of claim 8 wherein said thiophenol is thiophenol.

12. Ziegler polymerization catalyst, adapted for the low-pressure polymerization of ethylene, prepared by the method of claim 11.

13. In a method for preparing a Ziegler polymerization catalyst, adapted for the low-pressure polymerization of ethylene, wherein the catalyst is prepared by the interaction of (a) an aluminum compound of the general formula $R_2AlX$ wherein R is selected from the class consisting of alkyl, cycloalkyl and aryl radicals and X is selected from the class consisting of hydrogen, halogen, alkyl, cycloalkyl and aryl radicals with (b) a metal halide selected from the group consisting of the chlorides, bromides, and iodides of titanium and zirconium, the improvement comprising treating said catalyst with a thiophenol in an amount effective to modify said catalyst but insufficient to destroy its activity.

14. Ziegler polymerization catalyst, adapted for the low-pressure polymerization of ethylene, prepared by the method of claim 13.

15. In a method for preparing a Ziegler polymerization catalyst, adapted for the low-pressure polymerization of ethylene, wherein the catalyst is prepared by the interaction of (a) an aluminum compound of the general formula $R_2AlX$ wherein R is selected from the class consisting of alkyl, cycloalkyl and aryl radicals and X is selected from the class consisting of hydrogen, halogen, alkyl, cycloalkyl and aryl radicals, with (b) a salt of a group IV-B to group VI-B metal, the improvement comprising treating said salt prior to the time it is reacted with said aluminum compound with a thiophenol in an amount effective to modify the catalyst but insufficient to destroy its activity.

16. An improved Ziegler polymerization catalyst, adapted for the low-pressure polymerization of ethylene, prepared by the interaction of (a) an aluminum compound of the general formula $R_2AlX$ wherein R is selected from the class consisting of alkyl, cycloalkyl and aryl radicals and X is selected from the class consisting of hydrogen, halogen, alkyl, cycloalkyl and aryl radicals, with (b) a salt of a group IV-B to group VI-B metal, and treated with an amount of a thiophenol sufficient to give a catalyst capable of polymerizing ethylene to polyethylene of increased density.

17. The catalyst of claim 16 wherein said thiophenol is thiophenol.

18. A method which comprises polymerizing an ethylenically unsaturated hydrocarbon in the presence of a Ziegler polymerization catalyst, adapted for the low-pressure polymerization of ethylene, prepared by the interaction of (a) an aluminum compound of the general formula $R_2AlX$ wherein R is selected from the class consisting of alkyl, cycloalkyl and aryl radicals, and X is selected from the class consisting of hydrogen, halogen, alkyl, cycloalkyl and aryl radicals, with (b) a salt of a group IV–B to group VI–B metal, and modified but not deactivated by treatment with a thiophenol.

19. The method of claim 18 wherein said thiophenol is thiophenol.

20. A method of polymerizing ethylene in the presence of a Ziegler polymerization catalyst, adapted for the low-pressure polymerization of ethylene, prepared by the interaction of (a) an aluminum compound of the general formula $R_2AlX$ wherein R is selected from the class consisting of alkyl, cycloalkyl and aryl radicals and X is selected from the class consisting of hydrogen, halogen, alkyl, cycloalkyl and aryl radicals, with (b) a salt of a group IV–B to group VI–B metal, said catalyst treated with a thiophenol in an amount resulting in polyethylene of increased density.

21. The method of claim 20 wherein said thiophenol is thiophenol.

References Cited in the file of this patent

UNITED STATES PATENTS

| | | |
|---|---|---|
| 2,843,577 | Friedlander et al. | July 15, 1958 |
| 2,865,903 | Seed | Dec. 23, 1958 |

FOREIGN PATENTS

| | | |
|---|---|---|
| 538,782 | Belgium | Dec. 6, 1955 |
| 682,420 | Great Britain | Nov. 12, 1952 |

OTHER REFERENCES

Whitby: "Synthetic Rubber," Wiley & Sons, Inc., New York (1954), pages 252–57.

UNITED STATES PATENT OFFICE
CERTIFICATE OF CORRECTION

Patent No. 3,009,908                                    November 21, 1961

Harry M. Andersen

It is hereby certified that error appears in the above numbered patent requiring correction and that the said Letters Patent should read as corrected below.

Column 5, line 26, for "Homoploymers" read -- Homopolymers --; line 51, for "an" read -- and --; column 6, line 22, for "in" read -- is --; column 7, line 39, for "mole" read -- more --; column 9, line 21, for "through" read -- thorough --; line 45, strike out "be", first occurrence.

Signed and sealed this 19th day of June 1962.

(SEAL)
Attest:

ERNEST W. SWIDER
Attesting Officer

DAVID L. LADD
Commissioner of Patents